United States Patent
Roberts et al.

(10) Patent No.: US 12,312,093 B2
(45) Date of Patent: *May 27, 2025

(54) METHOD AND SYSTEM FOR CONTROLLING ROTOR SPEEDS OF ROTOR SYSTEMS

(71) Applicant: TEXTRON INNOVATIONS INC., Providence, RI (US)

(72) Inventors: Brad John Roberts, Fort Worth, TX (US); Jonathan A. Wasylyszyn, Keller, TX (US)

(73) Assignee: Textron Innovations, Inc., Providence, RI (US)

( * ) Notice: Subject to any disclaimer, the term of this patent is extended or adjusted under 35 U.S.C. 154(b) by 1009 days.

This patent is subject to a terminal disclaimer.

(21) Appl. No.: 17/333,745

(22) Filed: May 28, 2021

(65) Prior Publication Data
US 2022/0024573 A1  Jan. 27, 2022

Related U.S. Application Data

(63) Continuation of application No. 15/960,732, filed on Apr. 24, 2018, now Pat. No. 11,072,434.

(51) Int. Cl.
*B64D 31/06* (2024.01)
*B64C 29/00* (2006.01)

(52) U.S. Cl.
CPC .......... *B64D 31/06* (2013.01); *B64C 29/0033* (2013.01)

(58) Field of Classification Search
CPC ..... B64D 31/06; B64C 29/0033; B64C 27/57; B64C 27/04; G05D 1/0066; G05D 1/0607
See application file for complete search history.

(56) References Cited

U.S. PATENT DOCUMENTS

| | | | | |
|---|---|---|---|---|
| 4,071,811 A | * | 1/1978 | Irwin | A63H 30/04 318/16 |
| 5,017,089 A | * | 5/1991 | Schneider | B64C 11/303 415/17 |
| 5,029,441 A | | 7/1991 | Parsons | |
| 6,140,803 A | | 10/2000 | Hurley et al. | |

(Continued)

FOREIGN PATENT DOCUMENTS

| | | |
|---|---|---|
| EP | 2851559 A1 | 3/2015 |
| EP | 3560833 A1 | 10/2019 |

(Continued)

OTHER PUBLICATIONS

European Patent Office, European Search Report for EP Appl. No. 19170241.4 dated Aug. 8, 2019, 4 pp.

(Continued)

*Primary Examiner* — Donald J Wallace
*Assistant Examiner* — Jalal C Coduroglu
(74) *Attorney, Agent, or Firm* — Daniel J. Chalker; Edwin S. Flores; Chalker Flores, LLP

(57) ABSTRACT

A method and system to control a rotor system includes automatically changing a rotor speed of the rotor system of the tiltrotor aircraft while moving the rotor system from a first position and a first rotor speed to a second position and a second rotor speed over a time period in accordance with an acceleration-rate profile that varies over the time period using a controller communicably coupled to the rotor system of the tiltrotor aircraft.

46 Claims, 11 Drawing Sheets

(56) References Cited

U.S. PATENT DOCUMENTS

| | | | |
|---|---|---|---|
| 7,002,318 B1* | 2/2006 | Schulz | B60L 3/0038 |
| | | | 318/490 |
| 9,235,217 B2 | 1/2016 | Barnes et al. | |
| 2002/0125852 A1* | 9/2002 | McClelland | H02P 25/08 |
| | | | 318/701 |
| 2005/0067995 A1* | 3/2005 | Weinhofer | B25J 9/1664 |
| | | | 318/574 |
| 2007/0118254 A1* | 5/2007 | Barnes | B64C 27/57 |
| | | | 701/3 |
| 2008/0283671 A1* | 11/2008 | Cherepinsky | B64D 31/06 |
| | | | 244/17.13 |
| 2009/0321554 A1* | 12/2009 | Roesch | B64C 27/26 |
| | | | 244/6 |
| 2011/0015034 A1* | 1/2011 | Ehinger | B64C 27/12 |
| | | | 477/70 |
| 2014/0252158 A1* | 9/2014 | Schaeffer | B64D 31/06 |
| | | | 244/17.13 |
| 2014/0331888 A1* | 11/2014 | Wernersbach | B60L 13/006 |
| | | | 104/282 |
| 2015/0274287 A1* | 10/2015 | Robertson | B64C 27/12 |
| | | | 475/269 |
| 2016/0023755 A1* | 1/2016 | Elshafei | G08G 5/54 |
| | | | 244/17.23 |
| 2016/0229547 A1* | 8/2016 | Fisher | B64C 11/303 |
| 2017/0217584 A1* | 8/2017 | Elfeky | B64C 27/56 |
| 2018/0141640 A1* | 5/2018 | Geiger | B64C 13/40 |
| 2019/0016451 A1* | 1/2019 | Ehinger | B64C 27/28 |
| 2019/0322380 A1 | 10/2019 | Roberts et al. | |

FOREIGN PATENT DOCUMENTS

| | | |
|---|---|---|
| JP | 4083222298 | 12/1996 |
| WO | 2017115120 A1 | 7/2017 |

OTHER PUBLICATIONS

European Patent Office, Communicaiton pursuant to Article 94(3) EPC for EP Appl. No. 19170241.4 dated Aug. 20, 2019, 7 pp.
European Patent Office, Communicaiton pursuant to Article 94(3) EPC for EP Appl. No. 19170241.4 dated Jul. 15, 2020, 6 pp.

* cited by examiner

METHOD AND SYSTEM FOR CONTROLLING ROTOR SPEEDS OF ROTOR SYSTEMS

CROSS-REFERENCE TO RELATED APPLICATIONS

This application is a continuation of and claims priority to U.S. patent application Ser. No. 15/960,732 filed on Apr. 24, 2018 and entitled "Method and System for Controlling the Rotor Speeds of Rotor Systems", which is hereby incorporated by reference in its entirety.

STATEMENT OF FEDERALLY FUNDED RESEARCH

Not applicable.

TECHNICAL FIELD OF THE INVENTION

The present invention relates in general to the field of tiltrotor aircraft, and more particularly to a method and system for controlling the rotor speeds of the rotor systems of tiltrotor aircraft.

BACKGROUND OF THE INVENTION

Without limiting the scope of the invention, its background is described in connection with tiltrotor aircraft.

Rotorcraft typically have one or more rotor systems that operate by maintaining rotor speeds within a specified, relatively small range of a reference rotor speed, which is a rotor rotational speed selected for optimal performance for a given type of rotorcraft during a given flight mode. A collective governor and a throttle governor alter the rotor pitch and throttle setting, respectively, to change the rotor speed to keep it close to the reference rotor speed. A reference rotor speed is often called the "reference rpm," where "rpm" stands for "revolutions per minute," the unit commonly used in flight operations. For rotorcraft such as helicopters, the main rotor system or systems have axes that remain substantively parallel to the yaw axis of the rotorcraft, with relatively small departures for horizontal or diagonal flight, and they typically have a single reference rotor speed. Recently, some helicopters have added a selectable rotor speed reference change on the order of 1% or 2% to optimize a certain flight profile. These small changes in reference speed are associated with a fixed relatively low rate of change of reference speed.

Tiltrotor aircraft, however, have rotor systems with axes that are generally parallel to the yaw axis of the craft in a vertical-takeoff-and-landing (VTOL) mode, like a helicopter, and that are generally parallel to the roll axis of the craft in cruise mode, like an airplane. Typically, a tiltrotor aircraft has one reference rotor speed for VTOL flight and another reference rotor speed for cruise flight, and the reference rotor speed is changed from the VTOL reference rotor speed to the cruise reference rotor speed as required during a flight. Some tiltrotor aircraft have 2 reference rotor speeds for VTOL mode. The reference speeds will vary depending on various factors, such as temperature, altitude, weight, etc. For example, at light weight and low altitude a 100% speed reference is appropriate, while for high altitude and heavy weights a 104% reference speed is appropriate. The selectable or automatic reference speed change of 15 RPM is accomplished at a fixed rate of 5 RPM/second and occurs over approximately 3 seconds. For such small, slow changes in the drive system, the torque loads remain low and unremarkable.

Prior art methods and apparatuses for changing a rotor speed by transitioning from one reference rotor speed to another typically call for the reference rotor speed to be changed at a substantially steady rate from the initial speed to the final speed. Rapid changes, first from an initial steady state to a transitional steady state, and finally, from the transitional state to a final steady state, cause abrupt transient torque loads that in turn cause stress and wear that drive up maintenance and operations costs. These transient torque loads also require operators to fly with less weight in passengers, cargo, or fuel than they otherwise would to provide a margin of safety for the transient torque loads, and these loads can be uncomfortable for occupants. Methods and apparatuses for reducing the transient torque loads that are associated with changes to a rotorcraft's reference rotor speed are desirable.

SUMMARY OF THE INVENTION

In some embodiments of the disclosure, a method of controlling a rotor system is disclosed that includes providing a controller communicably coupled to the rotor system; and automatically changing a rotor speed of the rotor system from a first rotor speed in a first flight mode to a second rotor speed in a second flight mode over a time period using the controller in accordance with an acceleration-rate profile that varies over the time period. In one aspect, the method further includes receiving a signal at the controller to change the rotor system from the first flight mode to the second flight mode. In another aspect, the first flight mode includes a takeoff-and-landing mode and the second flight mode includes a cruise mode; or the first flight mode includes the cruise mode and the second flight mode includes the takeoff-and-landing mode. In another aspect, the method further includes determining the acceleration-rate profile based on one or more operational parameters including one or more of a rotor system performance parameter, an aircraft operational mode parameter, an aircraft characteristic parameter, or an environmental parameter. In another aspect, the method further includes determining the one or more operational parameters based on one or more sensors communicably coupled to the controller, one or more flight controls communicably coupled to the controller, or one or more signals from one or more remote devices communicably coupled to the controller. In another aspect, the acceleration-rate profile includes a multi-segment linear profile, a curved profile, a stair-stepped profile, or a combination thereof. In another aspect, the acceleration-rate profile includes at least one curved segment and at least one linear segment. In another aspect, the acceleration-rate profile includes an increasing acceleration rate for a first portion of the time period, a constant acceleration rate for a second portion of the time period, and a decreasing acceleration rate for a third portion of the time period. In another aspect, the rotor speed is changed over the time period according to a portion of the time period remaining in the time period or a difference between an actual rotor speed and a reference rotor speed. In another aspect, the acceleration-rate profile is implemented using to a control law based on a reference rotor speed and an actual rotor speed. In another aspect, the control law includes a variable acceleration command based on a portion of the time period remaining in the time period or a difference between the actual rotor speed and the reference rotor speed. In another aspect, the controller is an analog device, a digital device, or a combination thereof. In another aspect, the rotor speed is changed using the controller and at least one of a collective governor or a throttle governor. In another aspect, the rotor speed is changed by changing a reference rotor speed.

In some embodiments of the disclosure, an apparatus for controlling a rotor system is disclosed that includes a controller operably coupled to the rotor system and operably configured to automatically change a rotor speed of the rotor system from a first rotor speed in a first flight mode to a second rotor speed in a second flight mode over a time period in accordance with an acceleration-rate profile that varies over the time period. In one aspect, the apparatus further includes one or more control devices or one or more remote devices communicably coupled to the controller that operably configured to send or receive a signal to change the rotor system from the first rotor speed to the second rotor speed. In another aspect, the one or more control devices include a collective governor or a throttle governor. In another aspect, the first flight mode includes a takeoff-and-landing mode and the second flight mode includes a cruise mode; or the first flight mode includes the cruise mode and the second flight mode includes the takeoff-and-landing mode. In another aspect, the controller determines the acceleration-rate profile based on one or more operational parameters including one or more of a rotor system performance parameter, an aircraft operational mode parameter, an aircraft characteristic parameter, or an environmental parameter. In another aspect, the acceleration-rate profile includes a multi-segment linear profile, a curved profile, a stair-stepped profile, or a combination thereof. In another aspect, the acceleration-rate profile includes at least one curved segment and at least one linear segment. In another aspect, the acceleration-rate profile includes an increasing acceleration rate for a first portion of the time period, a constant acceleration rate for a second portion of the time period, and a decreasing acceleration rate for a third portion of the time period. In another aspect, the controller changes the rotor speed over the time period according to a portion of the time period remaining in the time period or a difference between an actual rotor speed and a reference rotor speed. In another aspect, the apparatus further includes one or more sensors communicably coupled to the controller and the rotor system. In another aspect, the controller implements the acceleration-rate profile using a control law based on a reference rotor speed and an actual rotor speed. In another aspect, the controller is an analog device, a digital device, or a combination thereof.

In some embodiments of the disclosure, a rotorcraft is disclosed that includes a fuselage; one or more engines coupled to the fuselage; a rotor system coupled to the one or more engines; and a controller operably coupled to the rotor system and operably configured to automatically change a rotor speed of the rotor system from a first rotor speed in a first flight mode to a second rotor speed in a second flight mode over a time period in accordance with an acceleration-rate profile that varies over the time period. In one aspect, the rotorcraft further includes one or more control devices or one or more remote devices communicably coupled to the controller that are operably configured to send or receive a signal to change the rotor system from the first rotor speed to the second rotor speed. In another aspect, the acceleration-rate profile includes an increasing acceleration rate for a first portion of the time period, a constant acceleration rate for a second portion of the time period, and a decreasing acceleration rate for a third portion of the time period. In another aspect, the rotorcraft further includes one or more sensors communicably coupled to the controller and the rotor system.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. The aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Although the exemplary embodiments described herein relate to tiltrotor aircraft, the present invention is applicable to any aircraft having rotors or propellers. In addition, the aircraft can be manned or unmanned (e.g., drones).

Figure 1A:
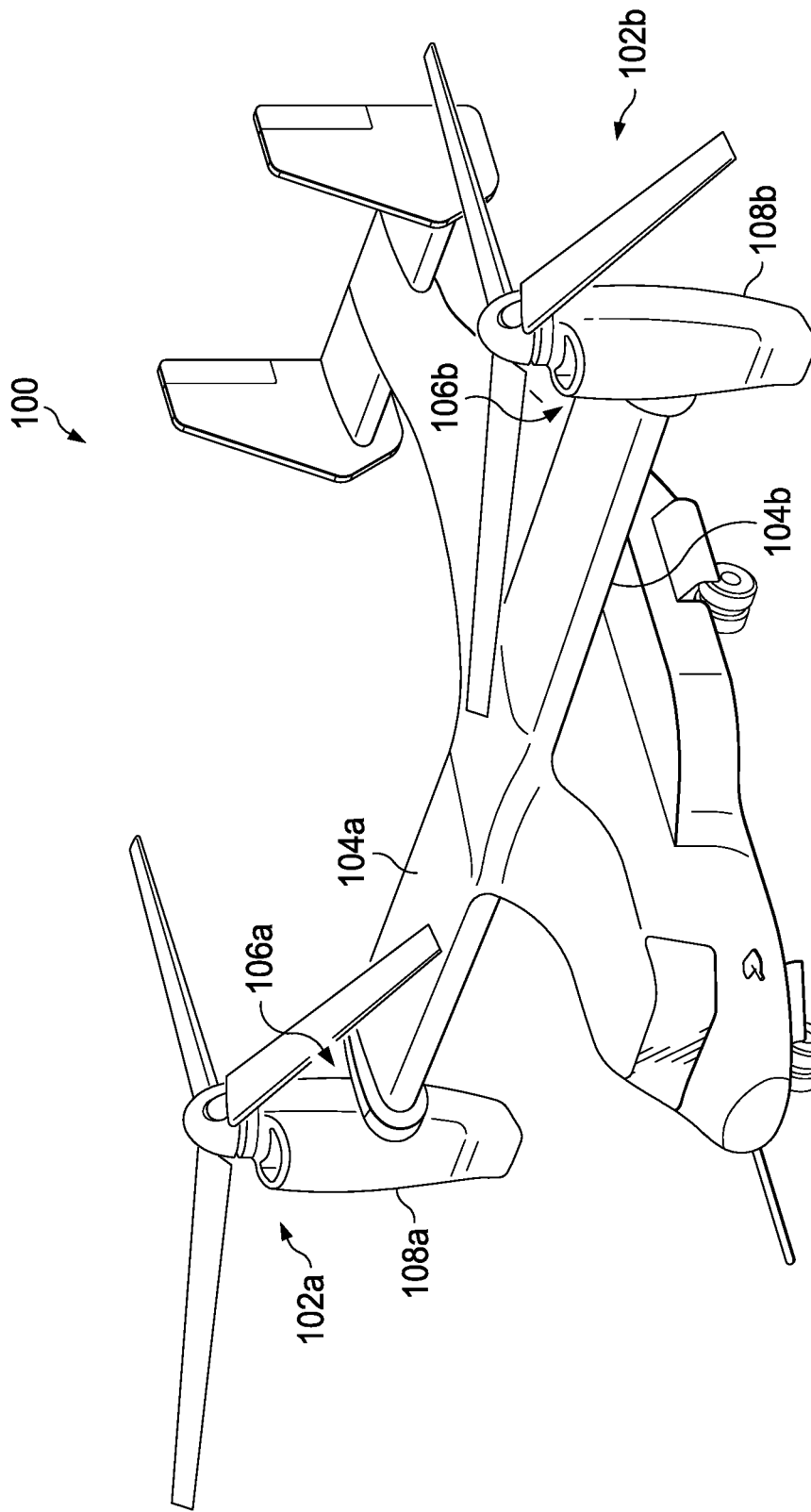
FIG. 1A shows a perspective view of a first tiltrotor aircraft in which the rotor system is in a takeoff-and-landing mode or hover mode according to a particular embodiment of the present application.
Figure 1B:
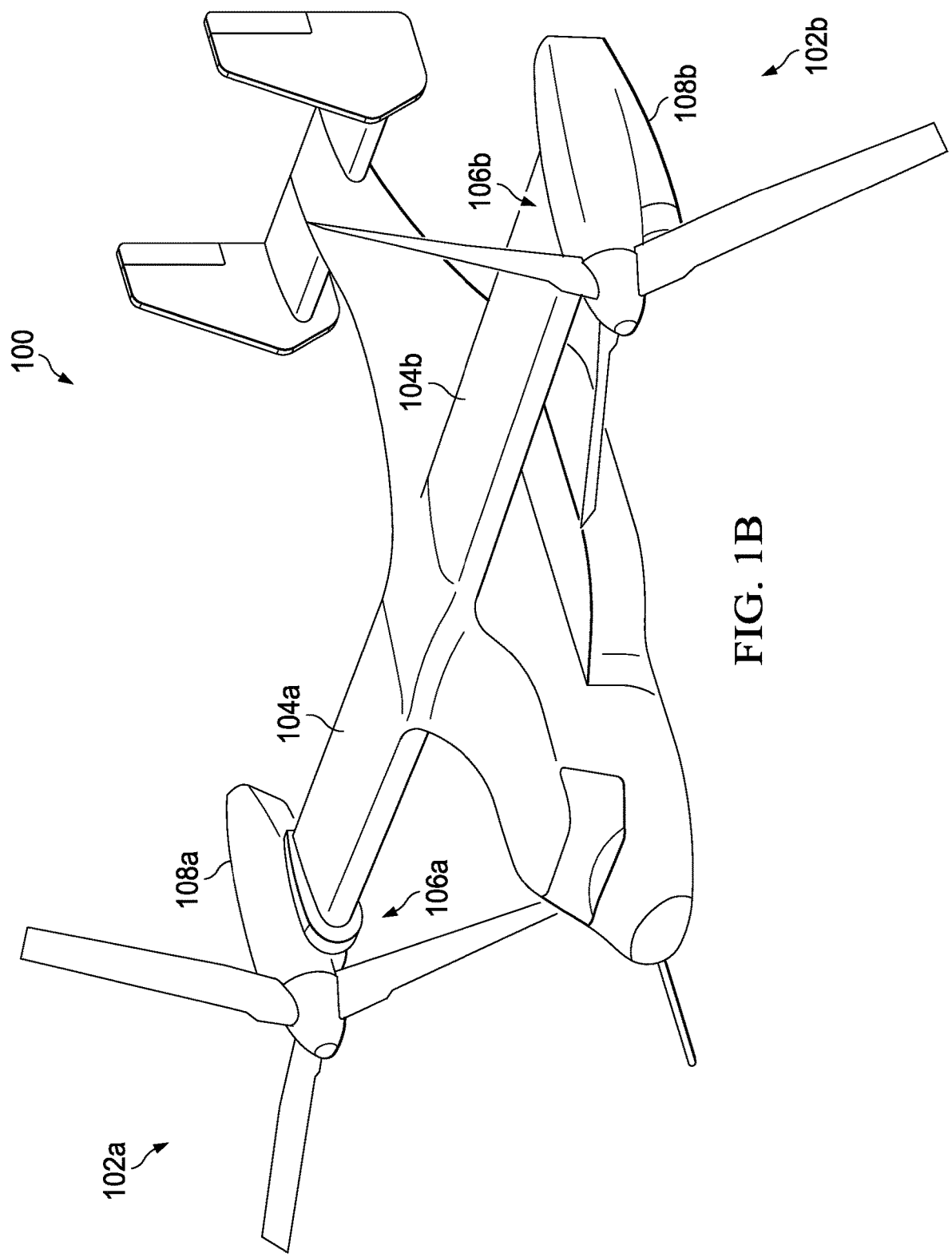
FIG. 1B shows a perspective view of the first tiltrotor aircraft in which the rotor system is in a cruise mode according to a particular embodiment of the present application.

FIGS. 1A and 1B show a tiltrotor aircraft 100 that utilizes the system and methods in accordance with the present invention. FIG. 1A illustrates the tiltrotor aircraft 100 in takeoff-and-landing mode or hover mode, and FIG. 1B depicts the tiltrotor aircraft 100 in airplane or cruise mode. Tiltrotor aircraft 100 includes tilt rotor assemblies 102a and 102b that are carried by wings 104a and 104b, and are disposed at end portions 106a and 106b of wings 104a and 104b, respectively. Tilt rotor assemblies 102a and 102b include nacelles 108a and 108b, which carry the engines and transmissions of tiltrotor aircraft 100. Tilt rotor assemblies 102a and 102b move or rotate relative to wing members 104a and 104b between a helicopter or vertical-takeoff-and-landing mode in which tilt rotor assemblies 102a and 102b are tilted upward, such that tiltrotor aircraft 100 flies like a conventional helicopter; and an airplane or cruise mode in which tilt rotor assemblies 102a and 102b are tilted forward, such that tiltrotor aircraft 100 flies like a conventional propeller driven aircraft.

Figure 2A:
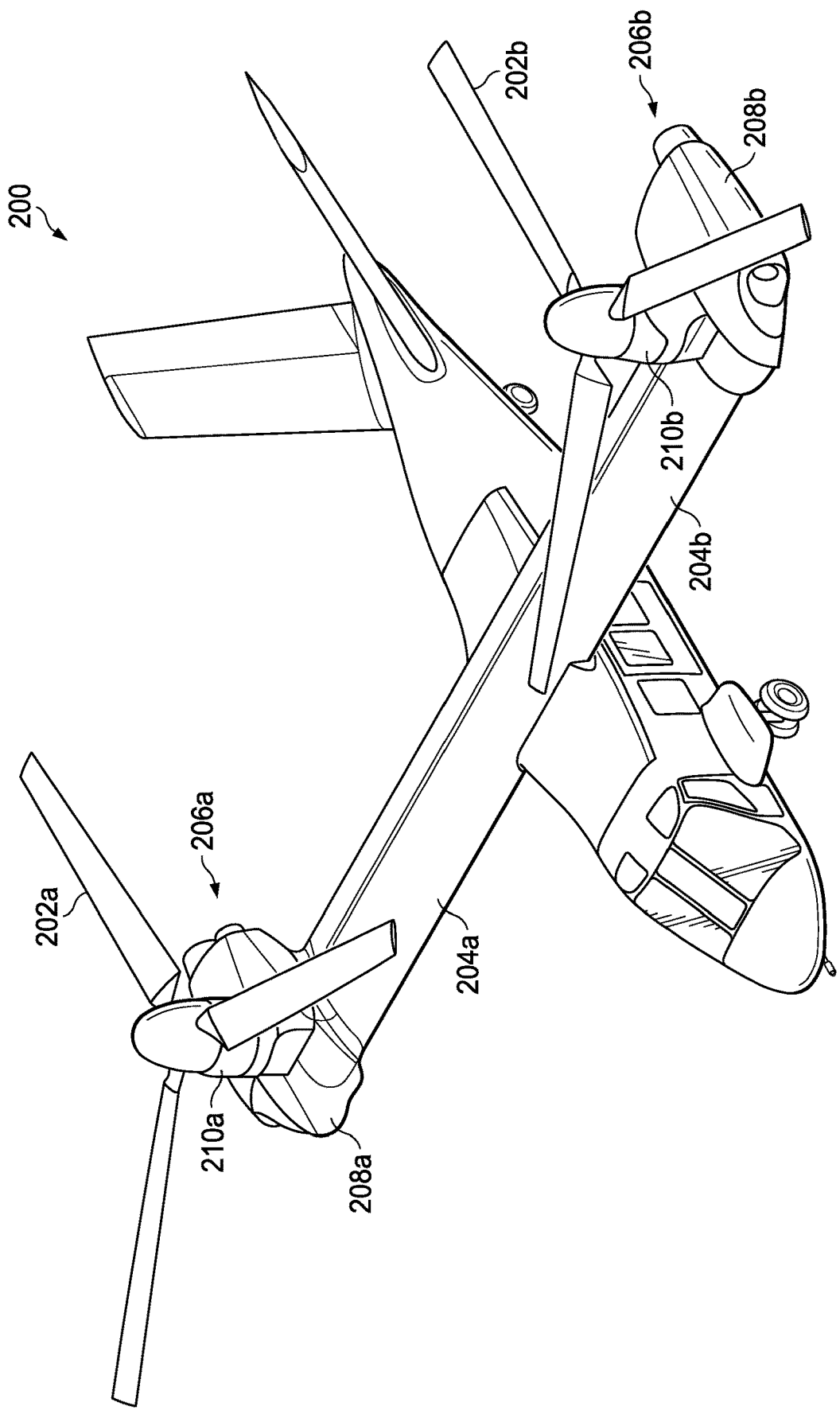
FIG. 2A shows a perspective view of a second tiltrotor aircraft in which the rotor system is in a takeoff-and-landing mode or hover mode according to a particular embodiment of the present application.
Figure 2B:
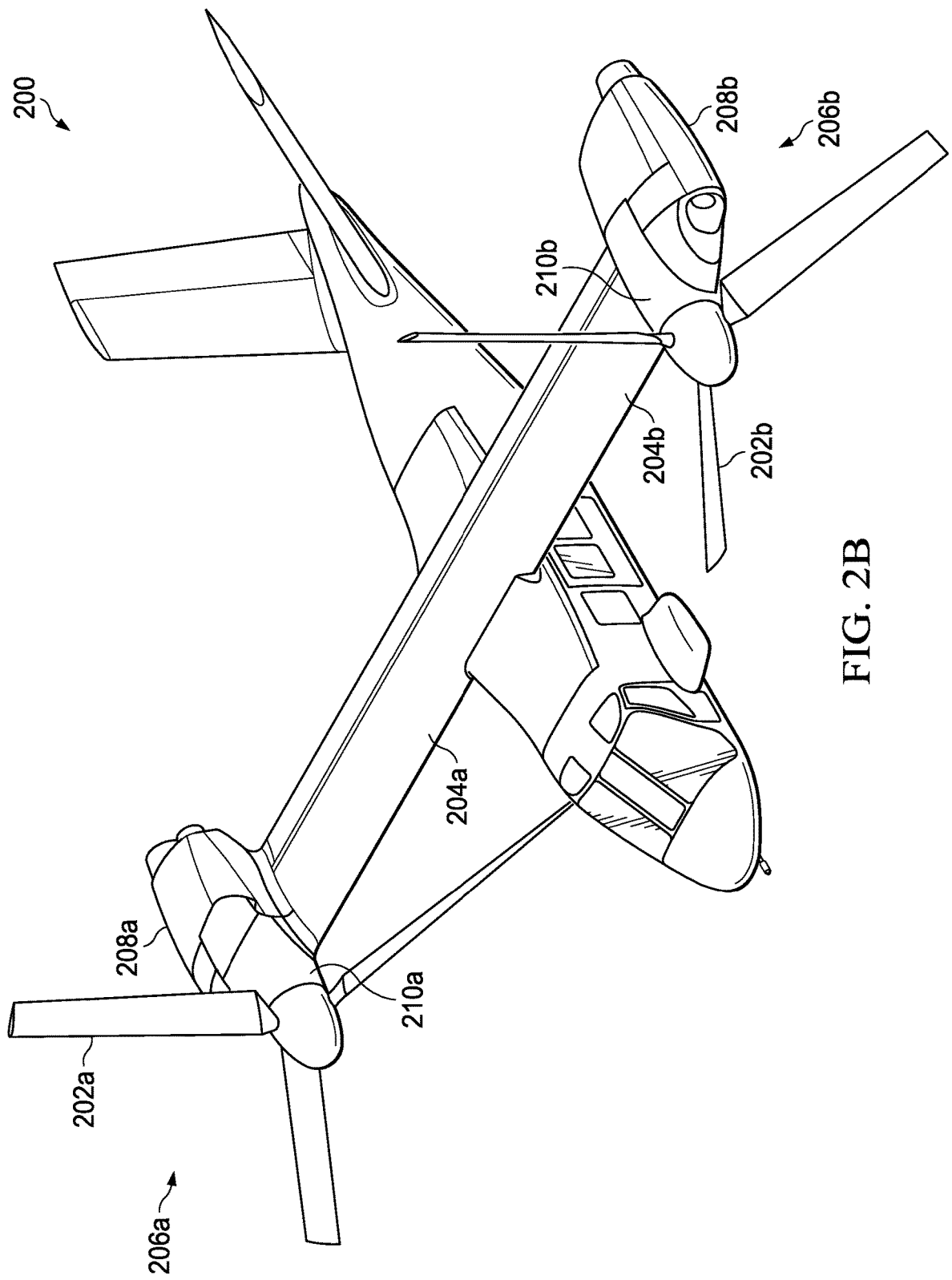
FIG. 2B shows a perspective view of the second tiltrotor aircraft in which the rotor system is in a cruise mode according to a particular embodiment of the present application.

FIGS. 2A and 2B show another tilt rotor aircraft 200 that utilizes the system and methods in accordance with the present invention. FIG. 2A depicts the tilt rotor aircraft 200 in a helicopter or vertical takeoff-and-landing mode, and FIG. 2B illustrates the tilt rotor aircraft 200 in airplane or cruise mode. Tilt rotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which include the engines and transmissions of tilt rotor aircraft 200. In this embodiment, the engines are fixed to the wing and do not rotate, rather, only the pylons 210a and 210b with the rotor assemblies 202a and 202b rotate. Tilt rotor assemblies 202a and 202b move and rotate relative to wing members 204a and 204b and the nacelles 208a and 208b. The tilt rotor assemblies 202a and 202b do not more relative to the wing members 204a and 204b. Instead, during the transition between a helicopter or hover mode only the pylons 210a and 210b with the rotor assemblies 202a and 202b rotate to redirect the thrust from the rotor assemblies 202a and 202b. The tilt rotor aircraft 200 is still able to fly like a conventional helicopter; and an airplane or cruise mode in which the rotors are tilted forward, such that tilt rotor aircraft 200 flies like a conventional propeller driven aircraft.

Figure 3A:
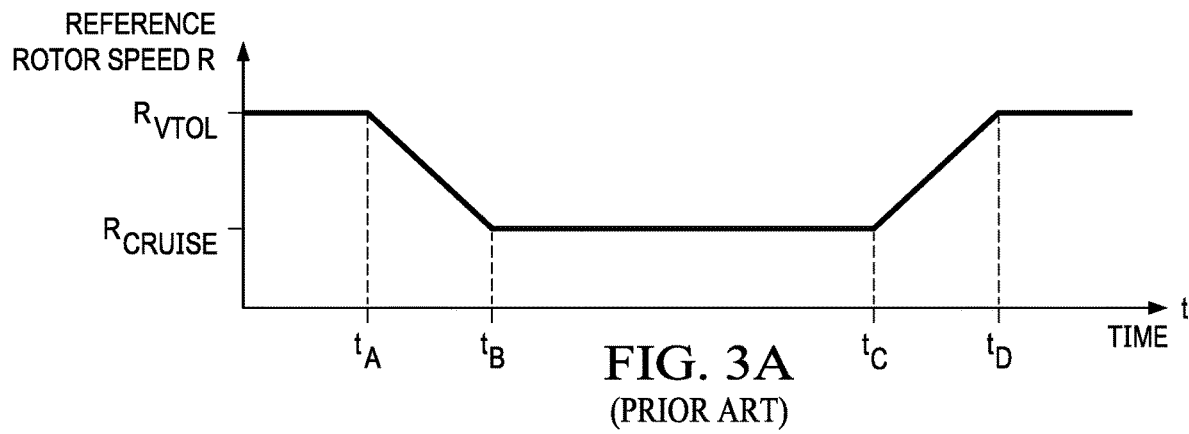
FIGS. 3A, 3B, and 3C show graphs depicting an exemplary transition from one reference rotor speed to another in accordance with the prior art.
Figure 3B:
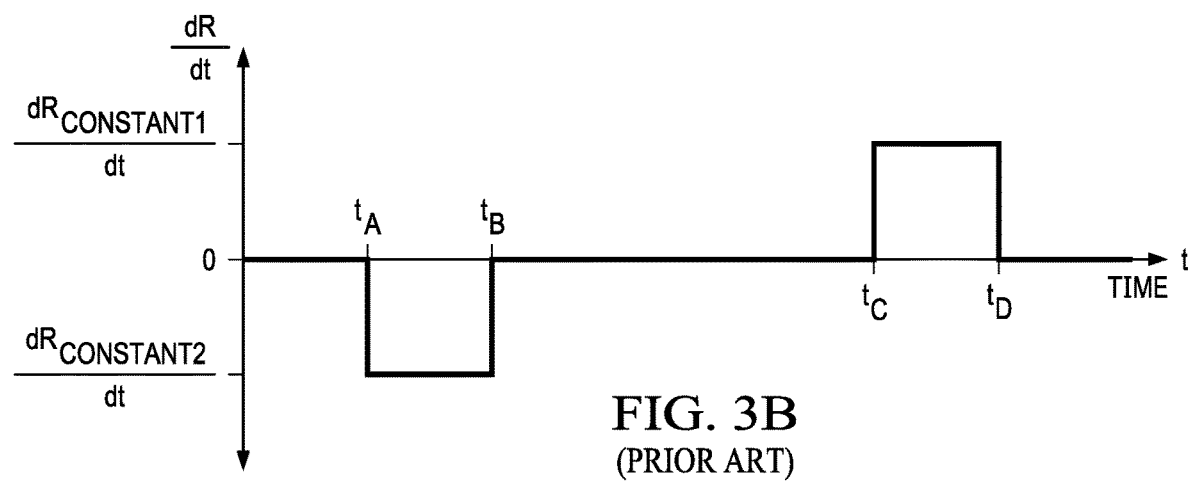
Figure 3C:
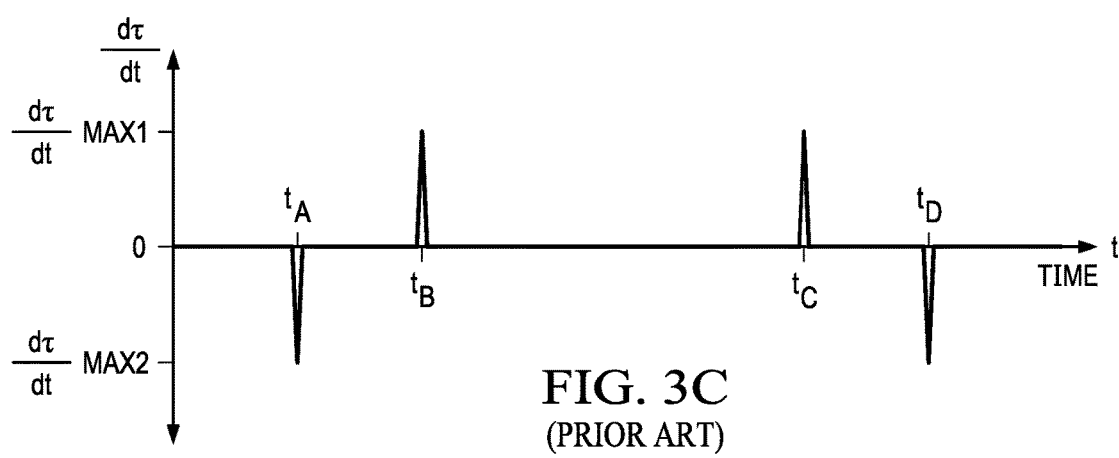

FIGS. 3A, 3B, and 3C show graphs depicting an exemplary transition, using prior art systems and methods of changing rotor speeds, from a VTOL reference rotor speed $R_{VTOL}$ to a cruise reference rotor speed $R_{CRUISE}$ and then back to the VTOL reference rotor speed $R_{VTOL}$, with time t on the horizontal axis and the reference rotor speed R on the vertical axis. The graph in FIG. 3A shows the reference rotor speed as it changes from $R_{VTOL}$ to $R_{CRUISE}$ during a first transitional time period and then back to $R_{VTOL}$ during a second transitional time period. The graph in FIG. 3B shows the rate of change of the reference rotor speed (i.e., acceleration/deceleration) as it changes during the transitional time periods, with time t on the horizontal axis and the rate of change of reference rotor speed, the first time derivative of the reference rotor speed, dR/dt, on the vertical axis. The transition from the $R_{VTOL}$ to $R_{CRUISE}$ takes place during transition period $t_A$ to $t_B$, and the transition from $R_{CRUISE}$ to $R_{VTOL}$ takes place during transition period $t_C$ to $t_D$. The dR/dt between $t_A$ and $t_B$ and between $t_C$ and $t_D$ represent constant rates of decrease and increase in R, here labeled $dR_{INT1}/dt$ and $dR_{INT2}/dt$, respectively. For example, to change the reference rotor speed from $R_{VTOL}$ (e.g., 100% RPM) to the target value $R_{CRUISE}$ (e.g., 80% RPM), the initial deceleration starts at 20 RPM/sec at $t_A$ and remains at 20 RPM/sec until reaching the target value of 80% RPM $t_B$ when the deceleration stops. Likewise, to change the reference rotor speed from $R_{CRUISE}$ (e.g., 80% RPM) to the target value $R_{VTOL}$ (e.g., 100% RPM), the initial acceleration starts at 20 RPM/sec at $t_C$ and remains at 20 RPM/sec until reaching the target value of 100% RPM at $t_D$ when the acceleration stops. These rapid changes from 0 RPM/sec acceleration/deceleration to 20 RPM/sec acceleration/deceleration and back to 0 RPM/sec acceleration/deceleration cause relatively large rotor torque loads and abrupt jerks felt by the structure, aircrew and passengers. FIG. 3C shows the rate of change of torque τ, dτ/dt, during the transitions, showing large spikes at the times $t_A$, $t_B$, $t_C$, and $t_D$ of stopping or starting an acceleration or deceleration.

Figure 4:
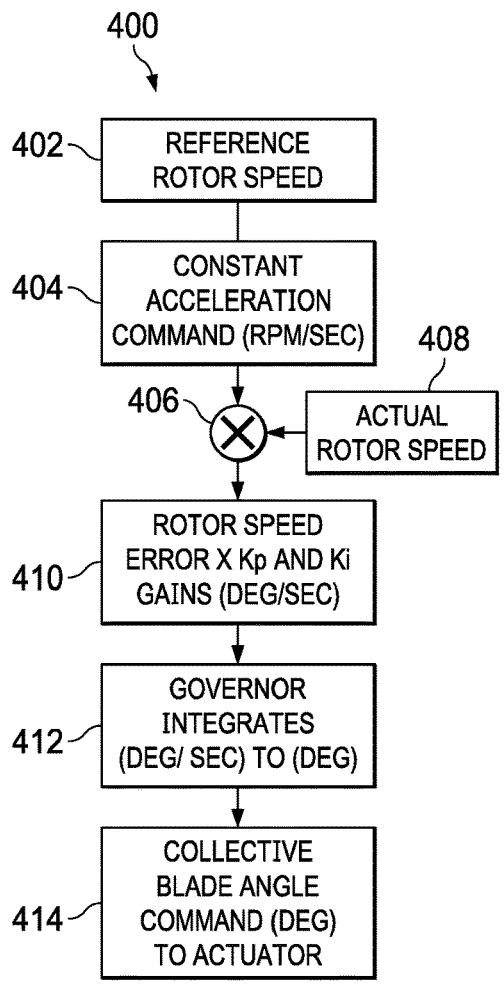
FIG. 4 is a block diagram for the operation of a system in accordance with the prior art.

FIG. 4 shows a diagram of a control law 400 for the operation of a rotor speed controller according to the prior art. The controller takes the current reference rotor speed 402 and executes a constant acceleration command (RPM/sec) in block 404 to increase or decrease the reference rotor speed at a fixed rate or constant acceleration. The controller compares 406 the new reference rotor speed to the actual rotor speed 408 to determine a RPM error X, proportional gain constant $K_p$ and integral gain constant $K_i$ (deg/sec) in block 410. Thereafter, a collective governor applies the proportional gain constant $K_p$ and the integral gain constant $K_i$ to the rotor speed error X and integrates the result to obtain a rotor pitch setting in block 412. The collective governor sends a collective blade angle command (deg) to the rotor system actuator in block 414. Note that in blocks 412 and 414, helicopters typically use a throttle governor and throttle actuator instead of a collective governor and blade pitch actuator, which are typically used in tiltrotor aircraft. The rapid acceleration/deceleration causes large rotor torque loads and abrupt jerks felt by the aircrews. Such high transient torque loads are detrimental, as previously discussed.

Figure 5:
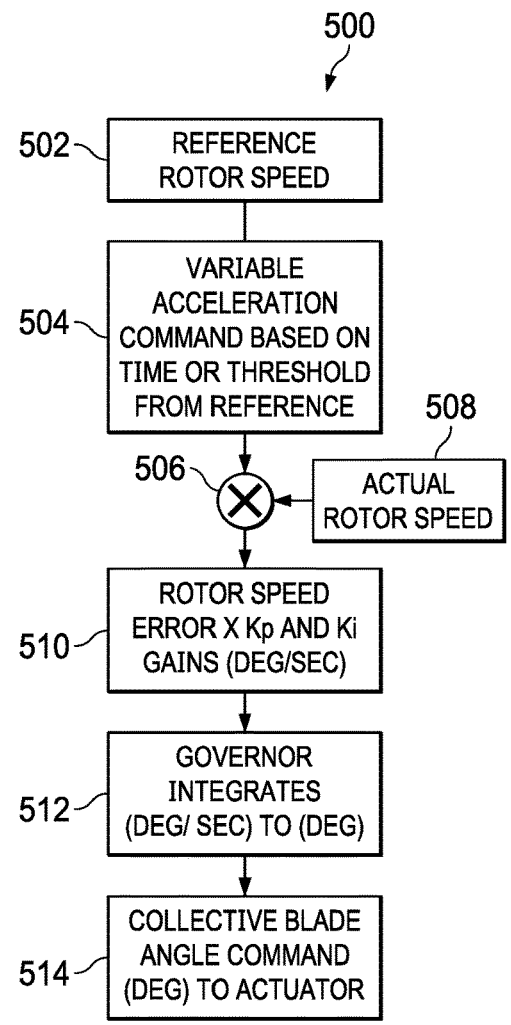
FIG. 5 is a block diagram of an embodiment of the present invention.

FIG. 5 shows a diagram of a control law 500 for the operation of an embodiment of the invention. The controller takes the current reference rotor speed 502 and executes a variable acceleration command based on time or threshold from the reference in block 504 to increase or decrease the reference rotor speed in accordance with an acceleration-rate profile. The controller compares 506, the new reference rotor speed, to the actual rotor speed 508 to determine: a RPM error X, proportional gain constant $K_p$ and integral gain constant $K_i$ (deg/sec) in block 510. Thereafter, a collective governor applies the proportional gain constant $K_p$ and the integral gain constant $K_i$ to the rotor speed error X and integrates the result to obtain a rotor pitch setting in block 512. The collective governor sends a collective blade angle command (deg) to the rotor system actuator in block 514. Note that in blocks 512 and 514, the present invention can also be implemented using a throttle governor and throttle actuator, which are typically used in helicopters, instead of a collective governor and blade pitch actuator.

Figure 6A:
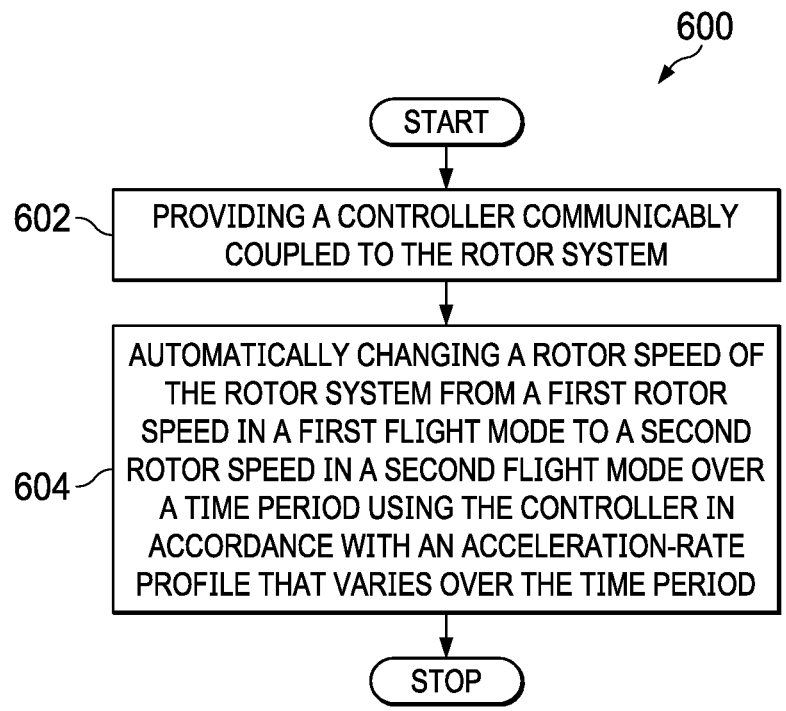
FIG. 6A shows a flowchart of a method in accordance with an embodiment of the present invention.

FIG. 6A shows a flowchart of a method 600 in accordance with an embodiment of the present invention. The method 600 for controlling a rotor system provides a controller communicably coupled to the rotor system in block 602, and automatically changes a rotor speed of the rotor system from a first rotor speed in a first flight mode to a second rotor speed in a second flight mode over a time period using the controller in accordance with an acceleration-rate profile that varies over the time period in block 604.

Figure 6B:
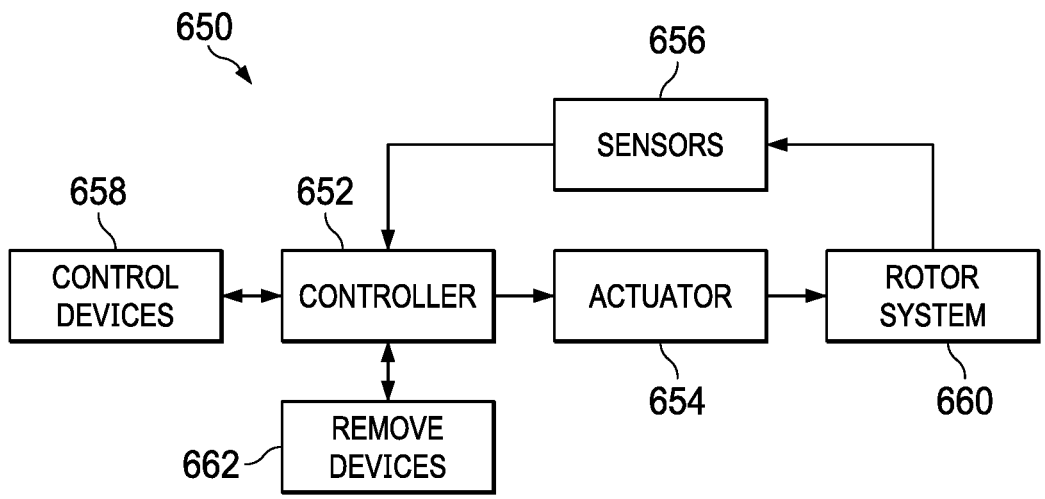
FIG. 6B shows a block diagram of a system in accordance with an embodiment of the present invention.

FIG. 6B is a block diagram of a system 650 in accordance with an embodiment of the present invention. The system 650 includes a controller 652 communicably coupled to an actuator 654, one or more sensors 656 and one or more flight controls 658. The rotor system 660 is communicably coupled to the actuator 654 and the one or more sensors 656. The controller 652 may also be communicably coupled to one or more remote devices 662. The controller 652 is configured to automatically change a rotor speed of the rotor system 660 from a first rotor speed in a first flight mode to a second rotor speed in a second flight mode over a time period in accordance with an acceleration-rate profile that varies over the time period. The system 650 may include other features as described in other portions of this description.

Figure 7A:
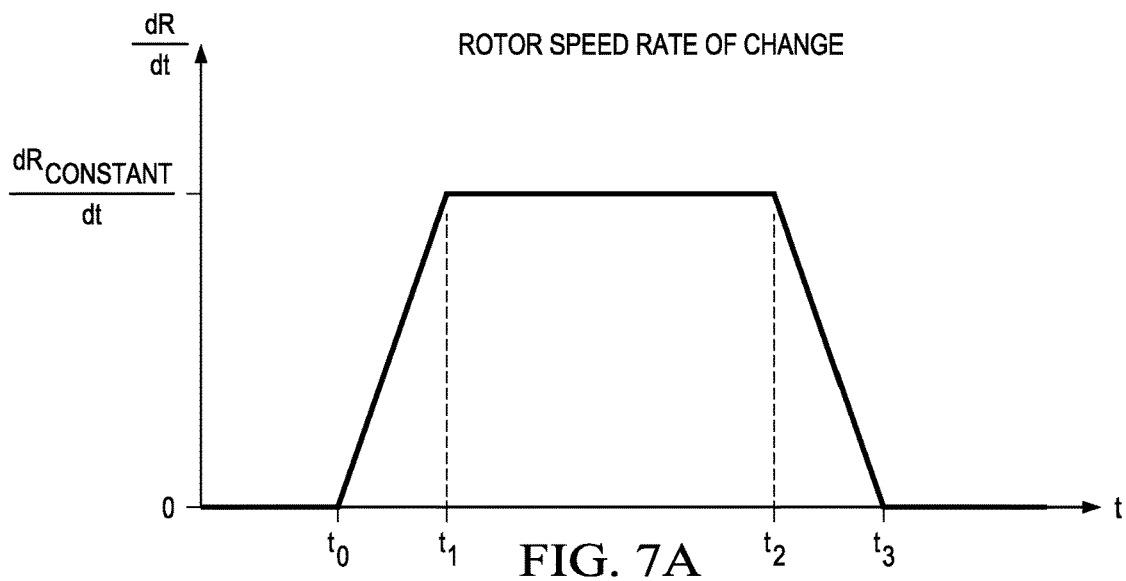
FIGS. 7A, 7B and 7C illustrate acceleration-rate profiles according to embodiments of the present invention.
Figure 7B:
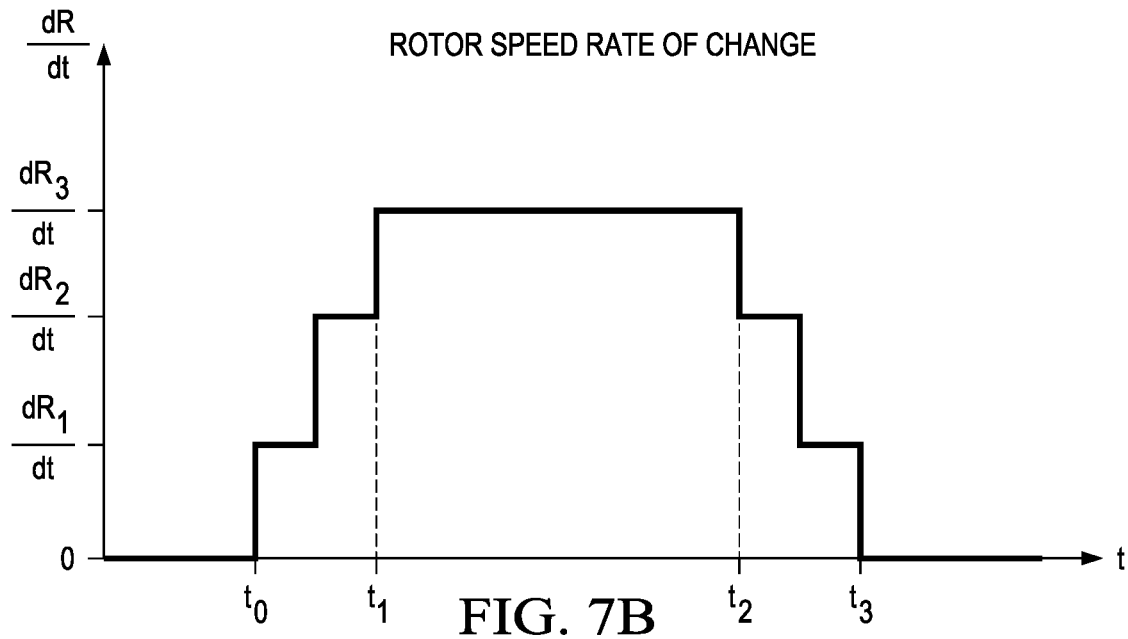
Figure 7C:
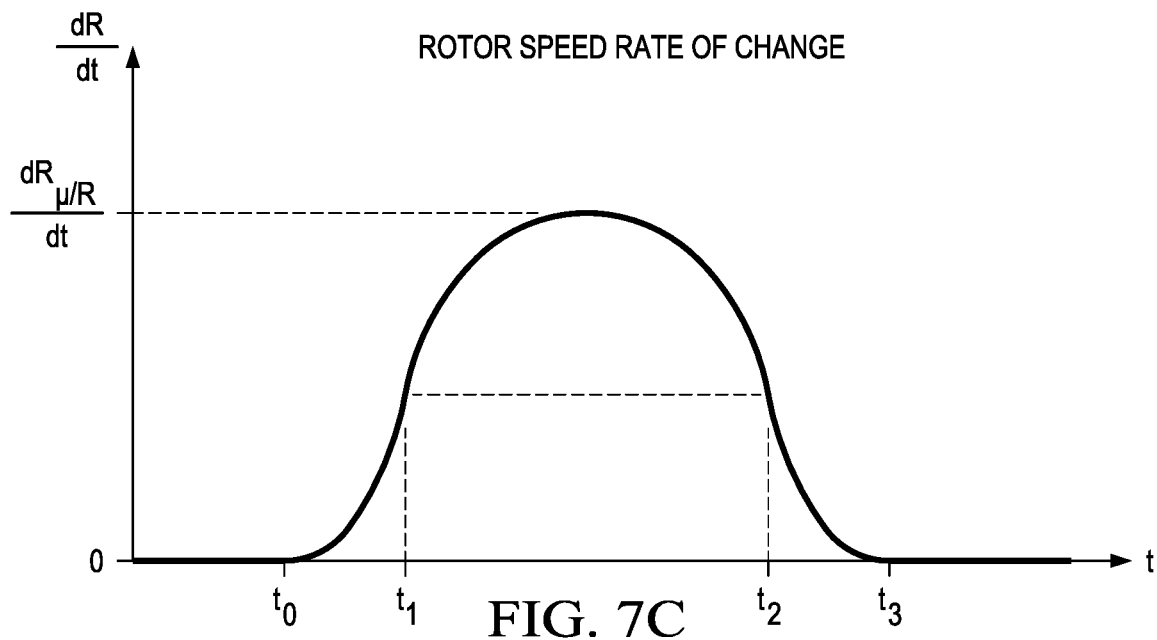

FIGS. 7A, 7B and 7C illustrate another aspect of embodiments of the present invention, in which the acceleration-rate profile of step 404 of method 400 includes a multi-segment linear profile, a stair-stepped profile, and a curved profile, respectively. The skilled artisan will recognize that the profiles depicted are exemplary, and that embodiments of the invention include other acceleration-rate profiles. In FIG. 7A, a multi-segment linear profile is shown on a graph with time t on the horizontal axis and the rate of change of rotor speed R, dR/dt, on the vertical axis. FIG. 7B shows a stair-stepped profile, with time t on the horizontal axis and dR/dt on the vertical axis. FIG. 7C depicts a curved profile, with time t on the horizontal axis and dR/dt on the vertical axis. The profile of FIG. 7A is discussed in more detail below in connection with FIGS. 8A, 8B, and 8C, and 9A, 9B, and 9C.

Figure 8A:
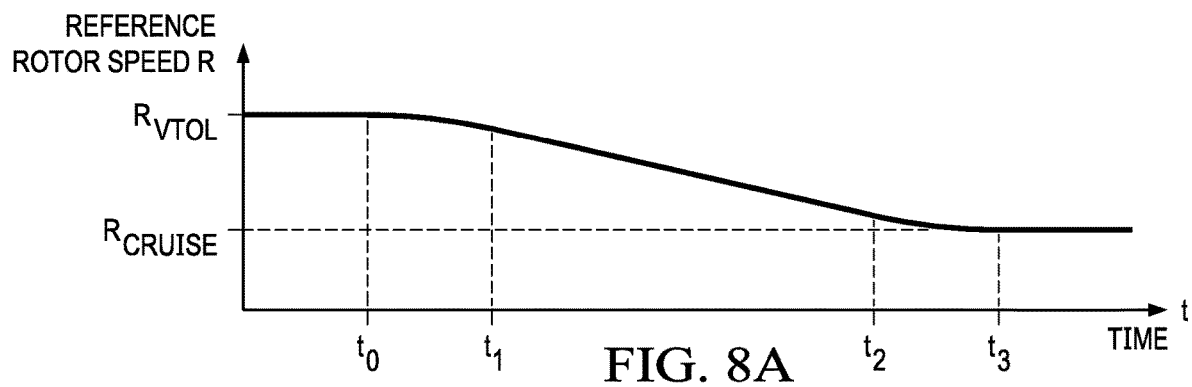
FIGS. 8A, 8B, and 8C show graphs depicting a transition from a VTOL reference rotor speed to a cruise reference rotor speed using an embodiment of the invention.
Figure 8B:
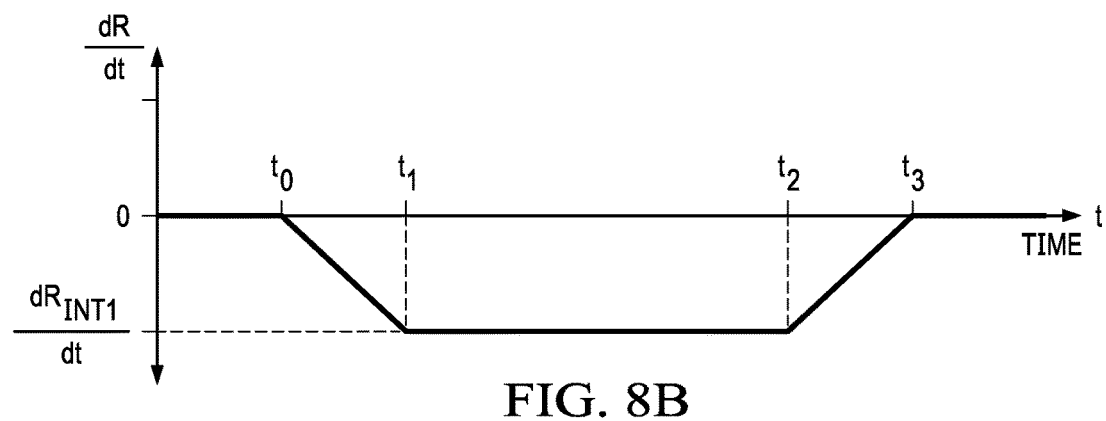
Figure 8C:
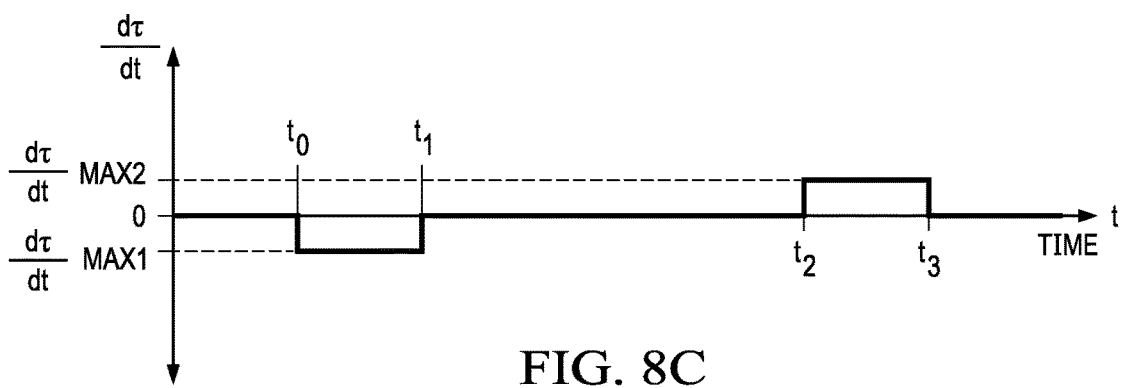

In one embodiment of the present invention, the rotor speed of a rotor system is changed by changing a rotor reference speed from one appropriate for one flight mode to another rotor reference speed that is appropriate for another flight mode. FIGS. 8A, 8B, and 8C show graphs depicting a transition from a VTOL reference rotor speed to a cruise reference rotor speed using an embodiment of the invention. The graph of FIG. 8A, with time t on the horizontal axis and reference rotor speed R on the vertical axis, shows the reference rotor speed R as it changes from the VTOL reference speed $R_{VTOL}$ to the cruise reference rotor speed $R_{CRUISE}$ during three transition time periods. First, in the initial transition period from $t_0$ to $t_1$ on the graph, the reference rotor speed R is changed at a rate that gradually increases in absolute value from $R_{VTOL}$ to an intermediate rate of change $dR_{INT}/dt$. During an intermediate transition period, $t_1$ to $t_2$ on the graph, R is changed at the steady rate $dR_{INT}/dt$. During a final transition period, $t_2$ to $t_3$ on the graph, R is changed at a rate that gradually decreases in absolute value from the intermediate rate of change $dR_{INT}/dt$ to a zero rate of change at the target reference rotor speed, $R_{CRUISE}$.

The graph of FIG. 8B, with time t on the horizontal axis and reference rotor speed rate of change dR/dt on the vertical axis, shows the rate of change of the reference rotor speed, dR/dt, as R changes from the $R_{VTOL}$ to $R_{CRUISE}$ during the three transition periods depicted in the first graph of FIG. 8A. First, in the initial transition period from $t_0$ to $t_1$ on the graph, the reference rotor speed R is changed at a rate dR/dt that gradually increases in absolute value from $R_{VTOL}$, at which dR/dt=0, to the intermediate rate of change, $dR_{INT1}/dt$. During the intermediate transition period, $t_1$ to $t_2$ on the graph, R is changed at the steady rate $dR_{INT}/dt$. During a final transition period, $t_2$ to $t_3$ on the graph, R is changed at rate that gradually decreases in absolute value from the intermediate rate of change $dR_{INT1}/dt$ to the target reference rotor speed, $R_{CRUISE}$, at which dR/dt=0 again. In one non-limiting example, a typical value for $R_{VTOL}$ is about 400 rpm, a typical value for $R_{CRUISE}$ is about 340 rpm, a typical intermediate rate of change from $R_{VTOL}$ to $R_{CRUISE}$, $dR_{INT1}/dt$, is −20 rpm/sec, and a typical time interval for the reference rotor speed to change from an initial to a target value is about 4 seconds (prior art would be about 3 seconds). In one example, the present invention reduces the loads by approximately 80% while only increasing the transition time by approximately 30%. The rotor speeds, transaction time and load reduction will vary according to the specific aircraft specifications in which the invention is implemented.

FIG. 8C shows the rate of change of torque τ, dτ/dt, during the transitions, with relatively small torque changes spread over times $t_0$ to $t_1$ and $t_2$ to $t_3$. From $t_0$ to $t_1$, $dτ/dt=(dτ/dt)_{MAX1}$; from $t_1$ to $t_2$, dτ/dt=0; and from $t_2$ to $t_3$, $dτ/dt=(dτ/dt)_{MAX2}$.

Figure 9A:
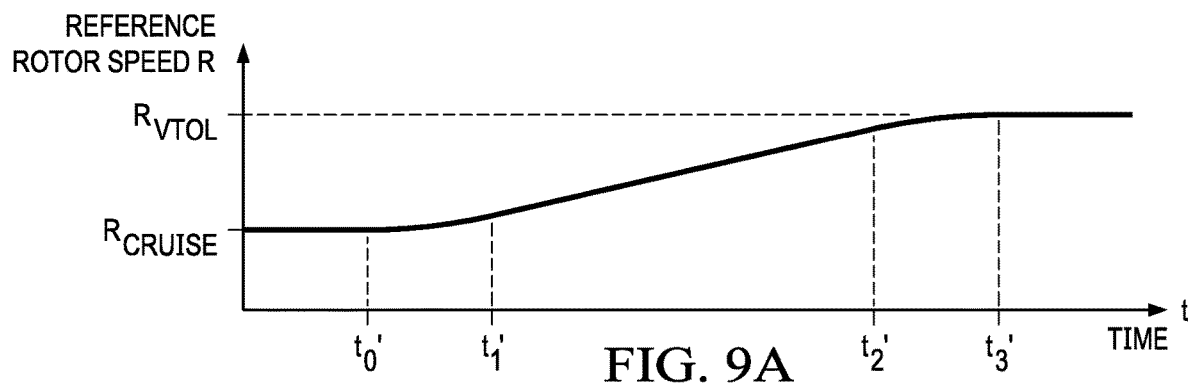
FIGS. 9A, 9B, and 9C show graphs depicting a transition from cruise reference rotor speed to VTOL reference rotor speed using an embodiment of the invention.
Figure 9B:
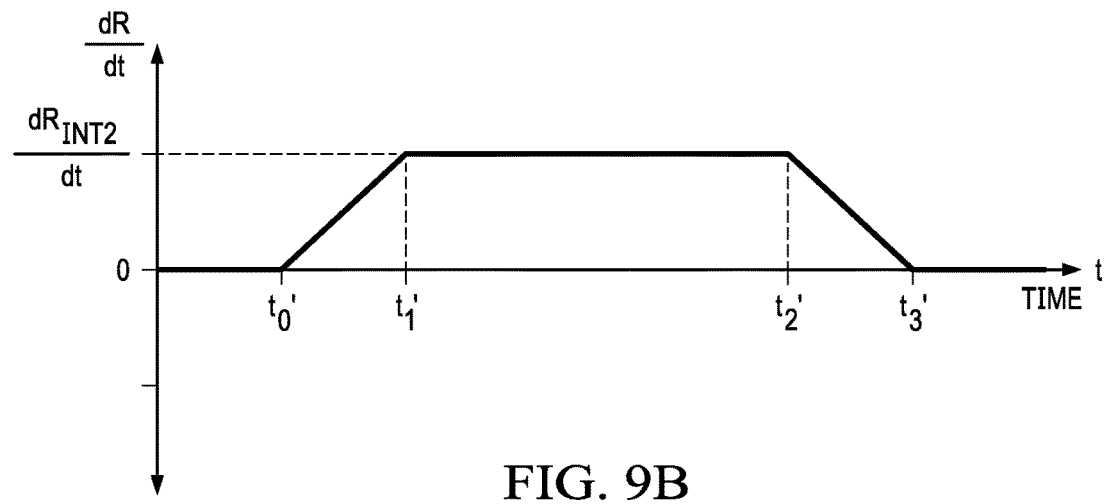

FIGS. 9A and 9B show two graphs depicting a transition from $R_{CRUISE}$ to $R_{VTOL}$ using an embodiment of the invention. The graph of FIG. 9A, with time t on the horizontal axis and reference rotor speed R on the vertical axis, shows the reference rotor speed as it changes from $R_{CRUISE}$ to $R_{VTOL}$ during three transition time periods. First, in the initial transition period from $t_0'$ to $t_1'$ on the graph, the reference rotor speed R is changed at a rate of change that gradually increases in absolute value from $R_{CRUISE}$ to an intermediate rate of change $dR_{INT}/dt$. During an intermediate transition period, $t_1'$ to $t_2'$ on the graph, R is changed at the steady rate of change $dR_{INT}/dt$. During a final transition period, $t_2'$ to $t_3'$ on the graph, R is changed at a rate of change that gradually decreases in absolute value from the intermediate rate of change $dR_{INT}/dt$ to a zero rate of change at the target reference rotor speed, $R_{VTOL}$.

The graph of FIG. 9B, with time t on the horizontal axis and reference rotor speed rate of change dR/dt on the vertical axis, shows the rate of change of the reference rotor speed, dR/dt, as R changes from the $R_{CRUISE}$ to $R_{VTOL}$ during the three transition periods depicted in the graph of FIG. 7A.

First, in the initial transition period from $t_0'$ to $t_1'$ on the graph, the reference rotor speed R is changed at a rate dR/dt that gradually increases in absolute value from $R_{CRUISE}$, at which dR/dt=0, to the intermediate rate of change, $dR_{INT2}$/dt. During the intermediate transition period, $t_1'$ to $t_2'$ on the graph, R is changed at the steady rate $dR_{INT}'$/dt. During a final transition period, $t_2'$ to $t_3'$ on the graph, R is changed at a rate from the intermediate rate of change $dR_{INT2}$/dt and gradually decreases in absolute value to the target reference rotor speed, $R_{VTOL}$ at which dR/dt=0 again.

Figure 9C:
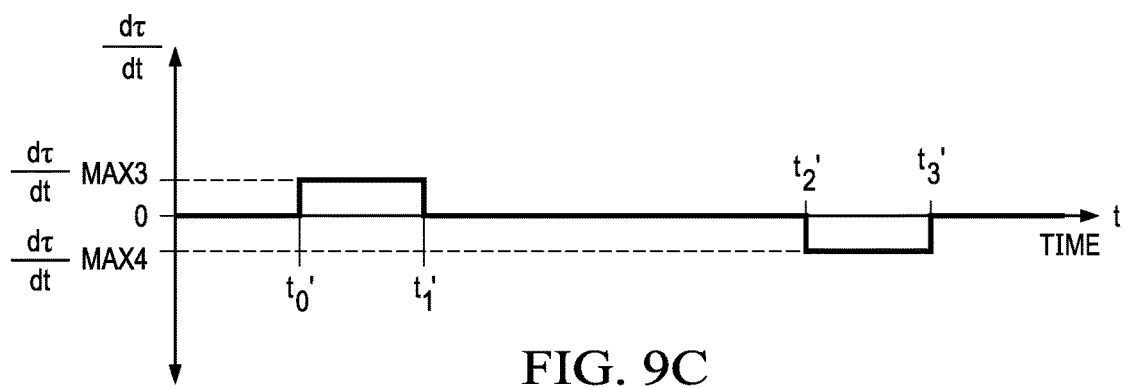

FIG. 9C shows the rate of change of torque τ, dτ/dt, during the transitions, with relatively small torque changes spread over times $t_0$, to $t_1'$ and $t_2'$ to $t_3''$. From $t_0$ to $t_1'$, $dτ/dt = dτ_{MAX3}/dt$; from $t_1$ to $t_2$, $dτ/dt=0$; and from $t_2$ to $t_3$, $dτ/dt = dτ_{MAX4}/dt$. In one non-limiting example, a typical value for $R_{VTOL}$ is about 400 rpm, a typical value for $R_{CRUISE}$ is about 340 rpm, a typical intermediate rate of change from $R_{CRUISE}$ to $R_{VTOL}$, $dR_{INT2}/dt$, is 20 rpm/sec, and a typical time interval for the reference rotor speed to change from an initial to a target value is about 4 seconds (prior art would be about 3 seconds). The actual values will vary according to the specific aircraft specifications in which the invention is implemented.

As opposed to prior art methods and systems for changing R, the relatively moderate slopes of the dR/dt curves at the beginnings and ends of the transition periods in FIGS. 8A, 8B, 8C, 9A, 9B, and 9C represent relatively moderate acceleration and deceleration in the reference rotor speed R. For example and referring to FIGS. 6A and 6B, to change the reference rotor speed from $R_{VTOL}$ (e.g., 100% RPM) to the target value $R_{CRUISE}$ (e.g., 80% RPM), the initial deceleration increases at a rate of 1 RPM/sec at $t_0$ to 20 RPM/sec until reaching 95% RPM at $t_1$, remains at 20 RPM/sec until reaching 85% RPM at $t_2$, and decreases at a rate of 1 RPM/sec until the target value of 80% RPM is reached at $t_3$ when the deceleration stops. Likewise and referring to FIGS. 7A and 7B, to change the reference rotor speed from $R_{CRUISE}$ (e.g., 80% RPM) to the target value $R_{VTOL}$ (e.g., 100% RPM), the initial acceleration increases at a rate of 1 RPM/sec at $t_0$, to 20 RPM/sec until reaching 85% RPM at $t_1'$, remains at 20 RPM/sec until reaching 95% RPM at $t_2'$, and decreases at a rate of 1 RPM/sec until the target value of 100% RPM is reached at $t_3'$ when the acceleration stops. These relatively moderate accelerations and decelerations induce minimal transient torque loads that put less stress on aircraft components and systems when compared to the results of the prior art systems and methods represented by the graphs of FIGS. 3A and 3B. Incidentally, the occupants of a tiltrotor craft benefitting from an embodiment of the present invention experience a much smoother transition than the transition of a typical tiltrotor using prior art systems and methods. Moreover, these reduced transient torque loads can allow lighter weight materials to be used in the aircraft, extend the life of aircraft components and reduce maintenance.

The present invention is not limited to controlling rotor acceleration/deceleration between predefined flight modes such as those described above (i.e., $R_{VTOL}$ and $R_{CRUISE}$). For example, the methods and systems described herein can be used as an acceleration/deceleration rate damper to smooth out aggressive or abrupt control movements by a pilot or autopilot. This acceleration/deceleration rate damper embodiment can be automatically or selectively engaged/disengaged based on the current flight operations of the aircraft. For example, the acceleration/deceleration rate damper can be engaged during normal flight operations, but disengaged or disabled during combat or emergency flight operations.

The present invention provides a variable acceleration commend to the collective or throttle governor. A time interval required to reach the target reference rotor speed, or a difference between the rotor speed measurement of the actual rotor speed and the target reference rotor speed, can be used to change the reference rotor speed as described in the descriptions of FIGS. 8A, 8B, 8C, 9A, 9B, and 9C. For example, the total time interval to reach the target reference rotor speed can be divided into an initial interval (first 25% of the total time interval), intermediate interval (middle 50% of the total time interval), and final interval (last 25% of the total time interval). During each interval, the controller compares the reference rotor speed, as determined by the control law for the relevant interval, to the actual rotor speed, derives the difference, called the rotor speed error (or rpm error), and sends the appropriate acceleration command to the governor. The governor then implements the received variable acceleration commands.

It is convenient to refer to VTOL reference rotor speed $R_{VTOL}$ as 100%; cruise reference rotor speed $R_{CRUISE}$ is typically about 80% of $R_{VTOL}$. Typical values for the reference rotor speeds under this criterion are a reduction of 20% of the VTOL reference rotor speed to reach the target cruise reference rotor speed, and thus 100%-95% of the VTOL reference rotor speed for the initial interval, 95%-85% of the VTOL reference rotor speed for the intermediate interval, and 85%-80% of the VTOL reference rotor speed for the final interval. Typical time values for the intervals involved are about 4.0 seconds to reach the target reference rotor speed, and about 1.0 second for the initial interval, about 2.0 seconds for the intermediate interval, and about 1.0 second for the final interval.

With the present invention, the gradually changing acceleration and deceleration of the reference rotor speed in the initial and final intervals subject the rotor system to considerably less torque than the abrupt acceleration and deceleration of the reference rotor speed in typical current systems and methods.

Figure 10:
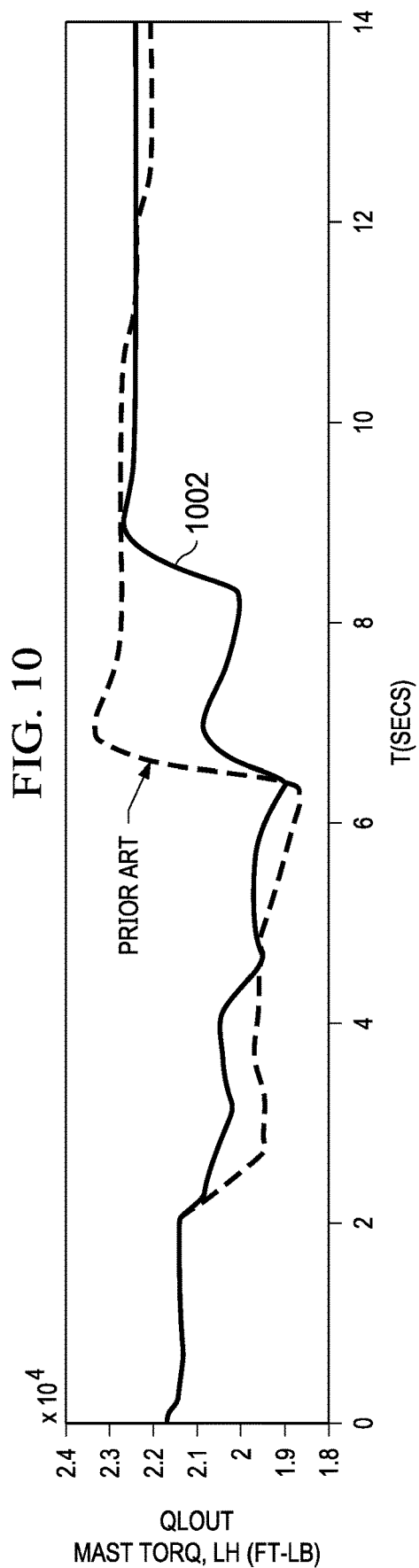
FIG. 10 shows a graph with prior art change in reference rotor speed and changes in reference rotor speed due to an embodiment of the present invention.

FIG. 10 illustrates a graph comparing data from changes in mast torque due to prior art changes in reference rotor speed and changes according to an embodiment of the present invention. The vertical axis represents mast torque in foot-pounds and the horizontal axis represents time in seconds over a period covering decreases and increases in reference rotor speeds. The prior art curve shows abrupt changes in mast torque due to an abrupt reduction of reference rotor speed between 2 and 3 seconds and due to an abrupt increase of reference rotor speed between 6 and 7 seconds. The curve 1002, generated by use of an embodiment of the present invention, shows a more gradual decrease in mast torque due to more gradual decreases in reference rotor speed between 2 and 3 seconds and between 4 and 5 seconds. The curve 1002 continues, showing a more gradual increase in mast torque between 6 and 7 seconds and another more gradual increase between 8 and 9 seconds due to more gradual increases in reference rotor speed. This graph illustrates changes in reference rotor speeds according to an embodiment of the present invention following a stair-stepped curve similar to that shown in FIG. 7B. Embodiments of the present invention may be implemented in a variety of ways. The controller may include a rotor speed controller such as a collective governor or a throttle governor, or it may include a flight control computer. Conversely, a rotor speed controller such as a collective governor or a throttle governor or a flight control computer may include the controller. Embodiments may be implemented as digital or analog systems and methods. The duration of the transition time, beginning when the reference rotor speed begins changing and ends when the reference rotor speed reaches the target reference rotor speed, may be selectable during flight by a pilot or by a remote operator. The criteria to which the reference rotor speed is changed over time, that is, (1) the time interval required to reach the target reference rotor speed or (2) the acceleration of the target reference rotor speed, may be selectable during flight by a pilot or by a remote operator. Embodiments of the invention may also be used in conventional rotorcraft, e.g., helicopters or other aircraft, in which more than one reference rotor speed is desirable.

The skilled artisan will recognize that the method 400 and system 450 of the present invention and their various embodiments and aspects allows for changes in rotor speeds from one flight mode to another without the abrupt transient torque loads encountered with prior art methods and systems in tiltrotor aircraft by reducing or eliminating rapid changes in the acceleration at which rotor speed changes are started and stopped.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic (s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A method of controlling a rotor assembly of a tiltrotor aircraft comprising:
   automatically changing a rotor speed of the rotor assembly of the tiltrotor aircraft while moving the rotor assembly or a pylon thereof from a first rotor position and a first rotor speed to a second rotor position and a second rotor speed over a time period in accordance with an acceleration-rate profile that varies over the time period using a controller communicably coupled to the rotor assembly of the tiltrotor aircraft.

2. The method of claim 1, further comprising receiving a signal at the controller to change the rotor assembly or the pylon thereof from the first rotor position to the second rotor position.

3. The method of claim 1, wherein:
   the first rotor position of the rotor assembly or the pylon thereof corresponds to a takeoff-and-landing mode or a hover mode, and the second rotor position of the rotor assembly or the pylon thereof corresponds to a cruise mode; or
   the first rotor position of the rotor assembly or the pylon thereof corresponds the cruise mode, and the second rotor position of the rotor assembly or the pylon thereof corresponds to the takeoff-and-landing mode or the hover mode.

4. The method of claim 1, wherein:
   the first rotor position of the rotor assembly or the pylon thereof is generally parallel to a yaw axis of the tiltrotor aircraft, and the second rotor position of the rotor assembly or pylon thereof is generally parallel to a roll axis of the tiltrotor aircraft; or
   the first rotor position of the rotor assembly or the pylon thereof is generally parallel to the roll axis of the tiltrotor aircraft, and the second rotor position of the rotor assembly or the pylon thereof is generally parallel to the yaw axis of the tiltrotor aircraft.

5. The method of claim 1, further comprising determining the acceleration-rate profile based on one or more operational parameters comprising one or more of a rotor assembly performance parameter, an aircraft operational mode parameter, an aircraft characteristic parameter, or an environmental parameter.

6. The method of claim 5, further comprising determining the one or more operational parameters based on one or more sensors communicably coupled to the controller, one or more flight controls communicably coupled to the controller, or one or more signals from one or more remote devices communicably coupled to the controller.

7. The method of claim 1, wherein the acceleration-rate profile comprises a multi-segment linear profile, a curved profile, a stair-stepped profile, or a combination thereof.

8. The method of claim 1, wherein the acceleration-rate profile comprises at least one curved segment and at least one linear segment.

9. The method of claim 1, wherein the acceleration-rate profile comprises an increasing acceleration rate for a first portion of the time period, a constant acceleration rate for a second portion of the time period, and a decreasing acceleration rate for a third portion of the time period.

10. The method of claim 1, wherein the rotor speed is changed over the time period according to a portion of the time period remaining in the time period or a difference between an actual rotor speed and a reference rotor speed.

11. The method of claim 1, wherein the acceleration-rate profile is implemented using to a control law based on a reference rotor speed and an actual rotor speed.

12. The method of claim 11, wherein the control law comprises a variable acceleration command based on a portion of the time period remaining in the time period or a difference between the actual rotor speed and the reference rotor speed.

13. The method of claim 1, wherein the controller is an analog device, a digital device, or a combination thereof.

14. The method of claim 1, wherein the rotor speed is changed using the controller and at least one of a collective governor or a throttle governor.

15. The method of claim 1, wherein the rotor speed is changed by changing a reference rotor speed.

16. An apparatus for controlling a rotor assembly of a tiltrotor aircraft, comprising:
   a controller operably coupled to the rotor assembly and operably configured to automatically change a rotor speed of the rotor assembly of the tiltrotor aircraft while moving the rotor assembly or the pylon thereof from a first rotor position and a first rotor speed to a second rotor position and a second rotor speed over a time period in accordance with an acceleration-rate profile that varies over the time period.

17. The apparatus of claim 16, further comprising one or more control devices or one or more remote devices communicably coupled to the controller that operably configured to send or receive a signal to change the rotor assembly or the pylon thereof from the first rotor speed to the second rotor speed.

18. The apparatus of claim 17, wherein the one or more control devices comprise a collective governor or a throttle governor.

19. The apparatus of claim 16, wherein:
   the first rotor position of the rotor assembly or the pylon thereof corresponds to a takeoff-and-landing mode or a hover mode, and the second rotor position of the rotor assembly or the pylon thereof corresponds to a cruise mode; or
   the first rotor position of the rotor assembly or the pylon thereof corresponds the cruise mode, and the second rotor position of the rotor assembly or the pylon thereof corresponds to the takeoff-and-landing mode or the hover mode.

20. The apparatus of claim 16, wherein:
   the first rotor position of the rotor assembly or the pylon thereof is generally parallel to a yaw axis of the tiltrotor aircraft, and the second rotor position of the rotor assembly or the pylon thereof is generally parallel to a roll axis of the tiltrotor aircraft; or
   the first rotor position of the rotor assembly or the pylon thereof is generally parallel to the roll axis of the tiltrotor aircraft, and the second rotor position of the rotor assembly or the pylon thereof is generally parallel to the yaw axis of the tiltrotor aircraft.

21. The apparatus of claim 16, wherein the controller determines the acceleration-rate profile based on one or more operational parameters comprising one or more of a rotor assembly performance parameter, an aircraft operational mode parameter, an aircraft characteristic parameter, or an environmental parameter.

22. The apparatus of claim 21, wherein the one or more operational parameters are based on one or more sensors communicably coupled to the controller, one or more flight controls communicably coupled to the controller, or one or more signals from one or more remote devices communicably coupled to the controller.

23. The apparatus of claim 16, wherein the acceleration-rate profile comprises a multi-segment linear profile, a curved profile, a stair-stepped profile, or a combination thereof.

24. The apparatus of claim 16, wherein the acceleration-rate profile comprises at least one curved segment and at least one linear segment.

25. The apparatus of claim 16, wherein the acceleration-rate profile comprises an increasing acceleration rate for a first portion of the time period, a constant acceleration rate for a second portion of the time period, and a decreasing acceleration rate for a third portion of the time period.

26. The apparatus of claim 16, wherein the controller changes the rotor speed over the time period according to a portion of the time period remaining in the time period or a difference between an actual rotor speed and a reference rotor speed.

27. The apparatus of claim 16, further comprising one or more sensors communicably coupled to the controller and the rotor assembly.

28. The apparatus of claim 16, wherein the controller implements the acceleration-rate profile using a control law based on a reference rotor speed and an actual rotor speed.

29. The apparatus of claim 28, wherein the control law comprises a variable acceleration command based on a portion of the time period remaining in the time period or a difference between the actual rotor speed and the reference rotor speed.

30. The apparatus of claim 16, wherein the controller is an analog device, a digital device, or a combination thereof.

31. The apparatus of claim 16, wherein the rotor speed is changed by changing a reference rotor speed.

32. A tiltrotor aircraft, comprising:
a fuselage;
one or more engines coupled to the fuselage or a wing coupled to the fuselage;
a rotor assembly coupled to the one or more engines; and
a controller operably coupled to the rotor assembly and operably configured to automatically change a rotor speed of the rotor assembly of the tiltrotor aircraft while moving the rotor assembly or a pylon thereof from a first rotor position and a first rotor speed to a second rotor position and a second rotor speed over a time period in accordance with an acceleration-rate profile that varies over the time period.

33. The tiltrotor aircraft of claim 32, further comprising one or more control devices or one or more remote devices communicably coupled to the controller that are operably configured to send or receive a signal to change the rotor assembly from the first rotor speed to the second rotor speed.

34. The tiltrotor aircraft of claim 33, wherein the one or more control devices comprise a collective governor or a throttle governor.

35. The tiltrotor aircraft of claim 32, wherein:
the first rotor position of the rotor assembly or the pylon thereof corresponds to a takeoff-and-landing mode or a hover mode, and the second rotor position or the pylon thereof corresponds to a cruise mode; or
the first rotor position of the rotor assembly or the pylon thereof corresponds the cruise mode, and the second rotor position of the rotor assembly or the pylon thereof corresponds to the takeoff-and-landing mode or the hover mode.

36. The tiltrotor aircraft of claim 32, wherein:
the first rotor position of the rotor assembly or the pylon thereof is generally parallel to a yaw axis of the tiltrotor aircraft, and the second rotor position is generally parallel to a roll axis of the tiltrotor aircraft; or
the first rotor position of the rotor assembly is generally parallel to the roll axis of the tiltrotor aircraft, and the second rotor position of the rotor assembly or the pylon thereof is generally parallel to the yaw axis of the tiltrotor aircraft.

37. The tiltrotor aircraft of claim 32, wherein the controller determines the acceleration-rate profile based on one or more operational parameters comprising one or more of a rotor assembly performance parameter, an aircraft operational mode parameter, an aircraft characteristic parameter, or an environmental parameter.

38. The tiltrotor aircraft of claim 37, wherein the one or more operational parameters are based on one or more sensors communicably coupled to the controller, one or more flight controls communicably coupled to the controller, or one or more signals from one or more remote devices communicably coupled to the controller.

39. The tiltrotor aircraft of claim 32, wherein the acceleration-rate profile comprises a multi-segment linear profile, a curved profile, a stair-stepped profile, or a combination thereof.

40. The tiltrotor aircraft of claim 32, wherein the acceleration-rate profile comprises at least one curved segment and at least one linear segment.

41. The tiltrotor aircraft of claim 32, wherein the acceleration-rate profile comprises an increasing acceleration rate for a first portion of the time period, a constant acceleration rate for a second portion of the time period, and a decreasing acceleration rate for a third portion of the time period.

42. The tiltrotor aircraft of claim 32, wherein the controller is an analog device, a digital device, or a combination thereof.

43. The tiltrotor aircraft of claim 32, further comprising one or more sensors communicably coupled to the controller and the rotor assembly.

44. The tiltrotor aircraft of claim 32, wherein the controller implements the acceleration-rate profile using a control law based on a reference rotor speed and an actual rotor speed.

45. The tiltrotor aircraft of claim 44, wherein the control law comprises a variable acceleration command based on a portion of the time period remaining in the time period or a difference between the actual rotor speed and the reference rotor speed.

46. The tiltrotor aircraft of claim 32, wherein the rotor speed is changed by changing a reference rotor speed.

* * * * *